United States Patent [19]
Elliott

[11] 3,804,025
[45] Apr. 16, 1974

[54] CONVERTIBLE RAIL-HIGHWAY VEHICLE
[75] Inventor: James O. Elliott, Bois D'Ark, Mo.
[73] Assignee: Auto Crane Company, Tulsa, Okla.
[22] Filed: May 22, 1972
[21] Appl. No.: 255,402

[52] U.S. Cl................................ 105/215 C, 104/245
[51] Int. Cl....... B61d 15/00, B61f 9/00, B62d 61/12
[58] Field of Search.......... 104/243, 245; 105/215 C

[56] References Cited
UNITED STATES PATENTS

| | | | |
|---|---|---|---|
| 3,020,858 | 2/1962 | Perkins et al. | 105/215 C |
| 3,581,671 | 6/1971 | Hart | 105/215 C |
| 3,130,686 | 4/1964 | Fiechter et al. | 105/215 C |
| 2,482,564 | 9/1949 | Townsend | 105/215 C |
| 2,915,989 | 12/1959 | Hoppe et al. | 105/215 C |
| 3,263,628 | 8/1966 | Grove et al. | 105/215 C |

*Primary Examiner*—Robert G. Sheridan
*Assistant Examiner*—Howard Beltran

[57] ABSTRACT

A retractable steel guide wheel assembly adaptable for installation on a pneumatic tired vehicle for transforming the vehicle into a convertible rail-highway vehicle. The guide wheel system is driven from the vehicle suspension system and provides a four corner structure wherein each corner is supported in a substantially identical manner. In the extended or supporting position for the steel wheels, the front wheels of the vehicle are elevated from engagement with the rails, and the rear wheels are maintained in engagement with the rails in a manner wherein the optimum force or weight is maintained on the rear wheels to provide optimum traction for driving and for braking vehicle during travel thereof along the rails. The wheels are retracted in a manner similar to the retractable wheels of an aircraft, but in an opposite direction of movement with respect thereto.

11 Claims, 15 Drawing Figures

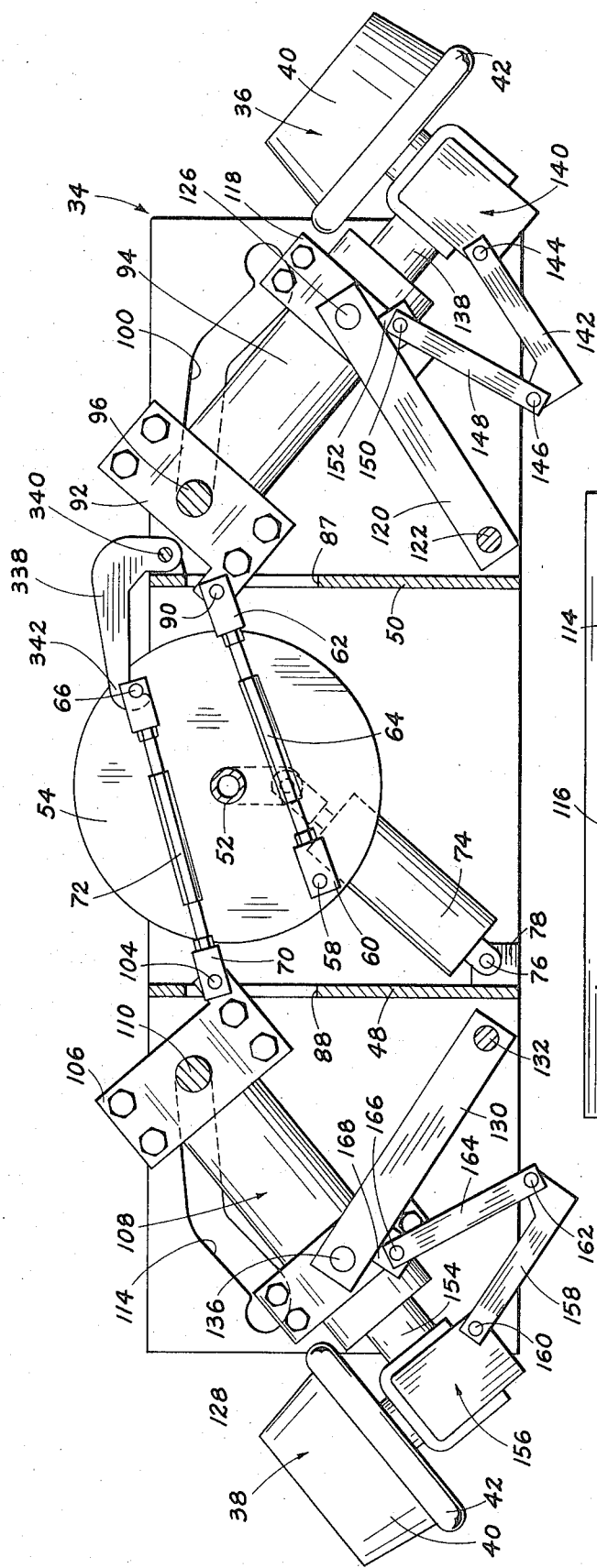

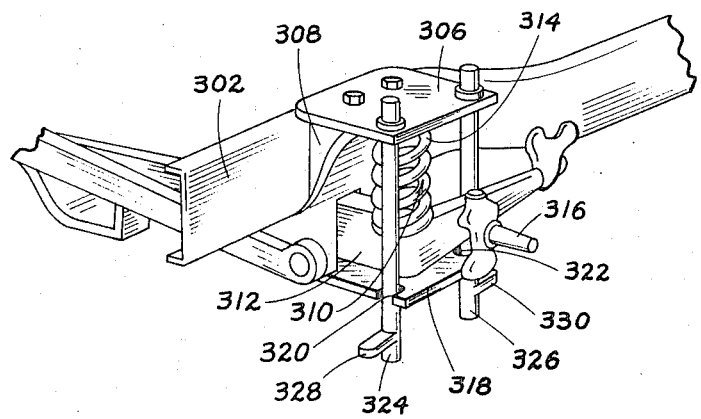
Fig. 13
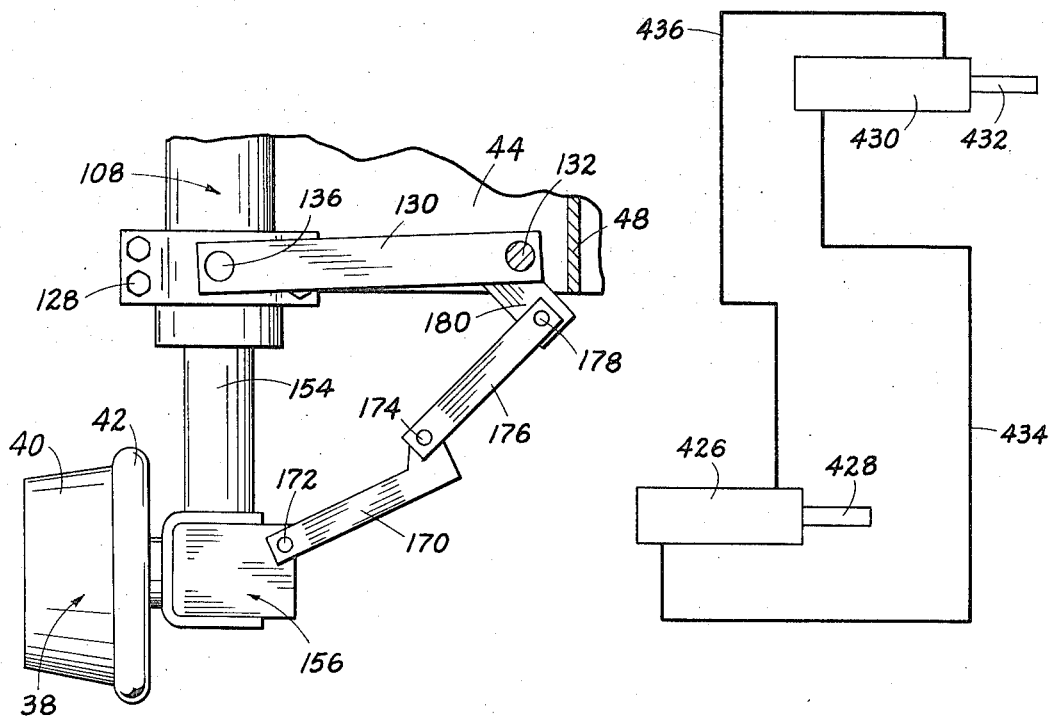
Fig. 15
Fig. 14

CONVERTIBLE RAIL-HIGHWAY VEHICLE

BACKGROUND OF THE INVENTION

1. Field of the Invention

This invention relates to improvements in steel guide wheels for convertible pneumatic tired rail-highway vehicles, and more particularly, but not by way of limitation, to a steel guide wheel assembly adapted for installation on substantially any pneumatic tired vehicle and being retractable in a manner similar to the retractable wheels of an aircraft.

2. Description of the Prior Art

Pneumatically tired convertible rail-highway vehicles are widely used on railroad tracks for many reasons. For example, railway inspection for facilitating railway maintenance, and the like, requires the use of such a vehicle for carrying proper personnel along the railway during an inspection tour, or the like, and for alternately moving along the highway for transporting the personnel to and from railway inspection sites. In addition, these vehicles having cranes mounted thereon are widely used in repair work along the railway, and frequently it is desirable to transport loads along the railway in this type of vehicle. When the vehicle is driven along the railroad tracks, it is the normal practice to provide steel guide wheels for the vehicle which are generally similar to the steel wheels used in connection with the usual railroad cars. As the vehicle moves along the railroad track, it is the normal practice to elevate the front wheels of the vehicle to preclude engagement thereof with the rails, and support the front of the vehicle from the front steel guide wheels. The rear wheels of the vehicle are normally retained in contact with the rails, and the rear steel guide wheels function in cooperation therewith to guide the movement of the wheels and to support a portion of the load of the vehicle in order that the force on the rear wheels will be only that which is required to maintain an efficient traction between the rear wheels and the rails for driving and braking of the vehicle.

In the past, the usual rubber tired vehicle constructed for normal highway use was provided with a mid-tread dimension complementary to the distance between the rails of the usual railroad track. Thus, it was a relatively simple and expedient matter to install steel guide wheel on the vehicle wherein the vehicle could be alternately utilized on or driven along railroad tracks or along the usual highway, as desired, and as shown in the Hoppe et al. U.S. Pat. No. 2,915,989, issued Dec. 8, 1959, and entitled "Vehicle for Highway and Railway Use."

In recent years, however, the mid-tread dimension of the usual readily available vehicle has been altered, and is no longer compatible with the distance between the rails of the track. As a consequence, it is usually necessary to alter the wheel support construction of the vehicle considerably in order to install steel guide wheels thereof for use of the vehicle on railway tracks, as shown in the James D. Hart U.S. Pat. No. 3,581,671, issued June 1, 1971, and entitled "Hydraulically Actuated Flanged Guide Wheels of a Convertible Rail-Highway Vehicle." Whereas alterations to the rear wheels of the vehicle are relatively simple, it will be readily apparent that alteration of the front wheels is complicated by the fact that vehicles utilized front wheel steering, and changes in the wheel supporting or mounting structure, or the like, causes corresponding changes in the wheel steering arrangement. In addition, it has been found that modification required on present vehicle wheel structures in accordance with the requirements for installing the presently available steel guide wheels thereon frequently renders the vehicle unsafe. For example, the strength of the wheel support structure may be altered during the modification, and a vehicle wheel may be lost during use of the vehicle on a road or highway. Derailment of the vehicle moving along the railway is also a hazard and disadvantage of the presently available steel guide wheels.

SUMMARY OF THE INVENTION

The present invention contemplates a novel retractable steel guide wheel assembly particularly designed and constructed for overcoming the foregoing disadvantages. The guide wheel assembly is driven from the suspension system of the vehicle and requires no modification of the vehicle wheel support structure itself. A steel guide wheel is provided in conjunction with each of the four corners of the vehicle, thus providing a four corner structure with each corner thereof supported in a substantially identical manner. The guide wheels are alternately retracted and extended by a hydraulic system wherein an independent control cylinder is provided for the operation of each guide wheel. Each of the control cylinders is provided with its own internal accumulator, thus assuring an efficient operation of each guide wheel independently from the operation of the other guide wheels. The control cylinders are particularly arranged with the integral accumulator for maintaining the respective guide wheels in an efficient operating condition even in the event a hydraulic line is broken wherein the supply of hydraulic fluid to the control cylinder is reduced or interrupted. The accumulator of each individual cylinder will function to maintain the cylinder in the extended position thereof for maintaining the guide wheel in the engaged position with the rail in a manner supporting the proper weight until the operator of the vehicle is able to detect the fluid loss condition and cease the operation of the vehicle for proper repairs.

The guide wheels are mounted on a support plate in a manner wherein the wheels are retracted in much the same manner as the retractable wheels of an aircraft. However, the guide wheels move outwardly and upwardly during a retracting operation, rather than inwardly and upwardly as in the aircraft wheel arrangement. When the guide wheels are in the elevated or retracted position, the pneumatic tires of the vehicle support the vehicle in the usual manner for travel thereof along the highway. When the vehicle is to be converted for railway use, the vehicle is driven onto the railroad tracks at a crossing, or the like, with the pneumatic tires positioned as nearly centrally disposed with respect to the rails as possible. As a practical matter, it is preferable to lower the front steel guide wheels first for elevating the pneumatic tired wheels from engagement with the rails. The rear steel guide wheels may then be lowered for assuming the desired portion of the load of the vehicle and maintaining only the optimum force on the rear pneumatic tired wheels of the vehicle to provide efficient driving and braking of the vehicle during travel thereof along the rails. Of course, the procedure is reversed when it is desired to restore the vehicle to the highway driving condition.

Each of the guide wheels is of the well known flanged type steel wheel wherein the guide wheel is steered and directed in its movement along the rails by the engagement between the flange and the rail, as is well known. In addition, each of the guide wheels is arranged for an automatic pivoting action as the rail curves or bends to prevent "crabbing" of the wheels. Normally only a plus or minus three and one-half degree pivotal or rotational movement for the wheels is required for the vehicle to safely and efficiently negotiate any curves or bends in the railway. Of course, as a practical matter, it is common sense to set the front wheels of the vehicle in a straight ahead position when the vehicle is moving along the railway, but it is not necessary to lock the front wheels in this straight ahead position.

BRIEF DESCRIPTION OF THE DRAWINGS

FIG. 7 is a view similar to FIG. 6 and depicts the guide wheels in the elevated or retracted position.

FIG. 8 is an elevational view of a mounting plate used in the guide wheel assembly, and particularly illustrates the guide slot for directing the movement of the guide wheels during elevating and lowering thereof.

FIG. 13 is a view of the connecting means for securing the guide wheel assembly to the spring suspension of a vehicle.

FIG. 14 is a schematic view of a hydraulic system for rotating the steel guide wheels during movement of the vehicle on a curving or bending rail.

FIG. 15 is a view of a modified lever arrangement for securing a guide wheel to the assembly frame.

DESCRIPTION OF THE PREFERRED EMBODIMENTS

Figure 1:
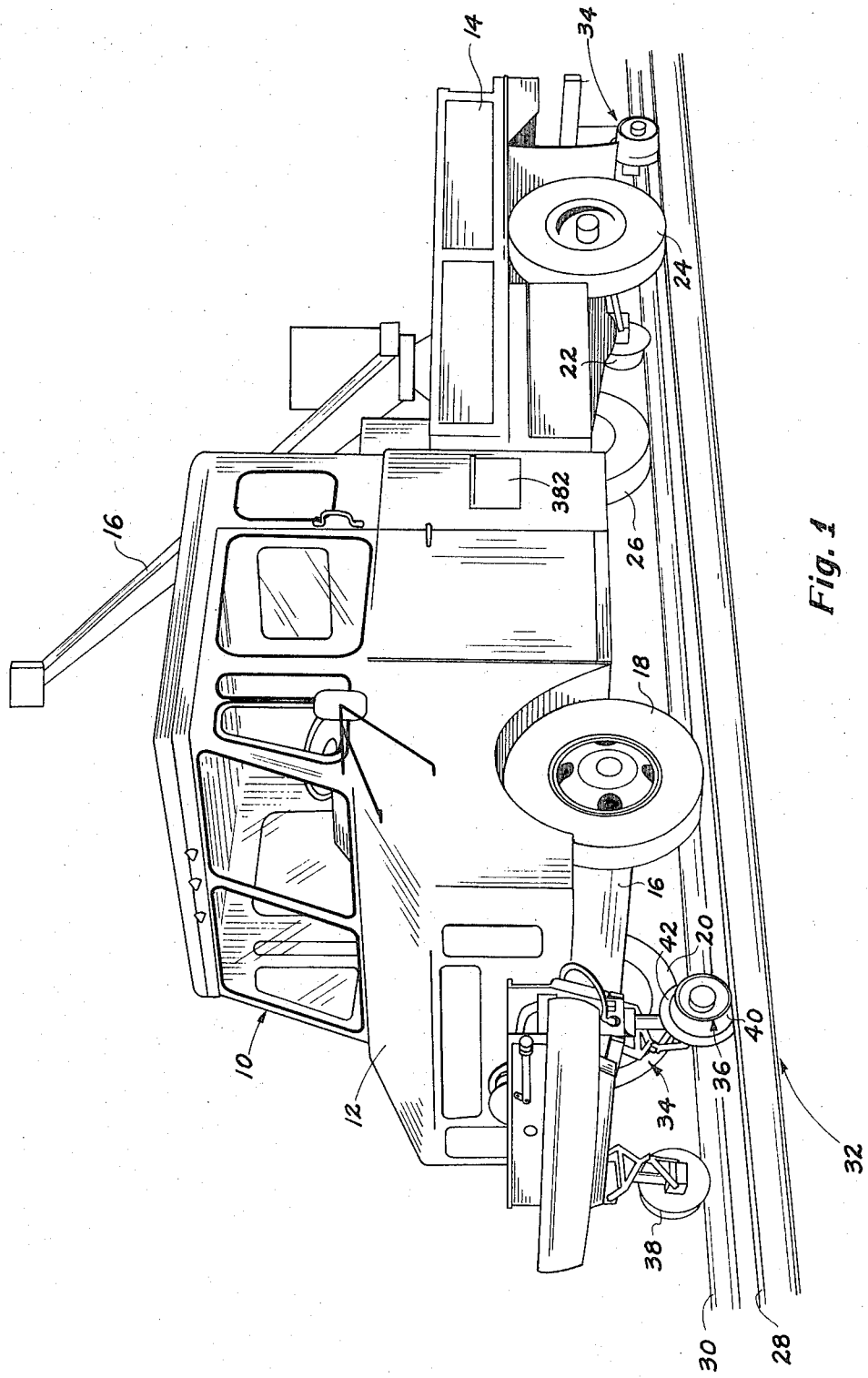
FIG. 1 is a perspective view of a pneumatic tired convertible rail-highway vehicle having a steel wheel guide assembly embodying the invention, and depicted in position for travel along a railway.

Referring to FIG. 1, a pneumatic tired convertible rail-highway vehicle is generally indicated at 10 which is of a heavy duty type construction similar to that known as a pick-up truck. As shown herein the vehicle 10 is of the type shown in the Jeep Corporation brochure dated January 1972 depicting the Jeep Road-Rail Service Car. Whereas the drawings relate to this specific type of vehicle, it is to be understood that the invention may be utilized in combination with substantially any readily available vehicle, and there is no intention of limiting the invention to the specific vehicle illustrated herein.

The vehicle 10 is particularly designed and constructed in accordance with federal governmental requirements for railway safety regulations, and comprises the usual cab portion 12 and load carrying portion 14, as is well known. If desired, a suitable crane 16 may be mounted on the load carrying portion 14 in any well known manner. A front axle 16 supporting a pair of oppositely disposed pneumatic tired front wheels 18 and 20 is provided for the vehicle 10, and a rear axle 22 supporting a pair of oppositely disposed pneumatic rear wheels 24 and 26 is provided for the vehicle 10, as is well known. In this particular vehicle, the mid-tread dimension of the front wheels 18 and 20 and the rear wheels 24 and 26 is preferably fifty nine and one-half inches, for compatibility with the opposed rails 28 and 30 of the railway 32. A separate retractable steel guide wheel assembly generally indicated at 34 is secured to both the front and rear ends of the vehicle 10 whereby one assembly 34 is in association with the front wheels 18 and 20, and the other assembly 34 is in association with the rear wheels 24 and 26. The front and rear guide wheels assemblies 34 are substantially identical and only one will be described in detail herein.

The guide wheel assembly 34 comprises a pair of substantially identical oppositely disposed flanged steel wheels 36 and 38 of the well known steel guide wheel type wherein each wheel 36 is provided with a cylindrical portion and an outwardly extending circumferential flange 42. The outer periphery of the cylinder portion 40 rides along the upper surface of the respective rail of the railway 32 when the guide wheels are in a guide position, as will be hereinafter set forth. The flange 42 bears against the adjacent side of the respective rail for guiding the cylinder portion 40 therealong during rail use of the vehicle 10, as is well known. As particularly shown in FIG. 2, the overall configuration of the vehicle 10 may be considered generally as a box having the four corners thereof substantially identically supported by the wheels 38 and 36.

Figure 6:
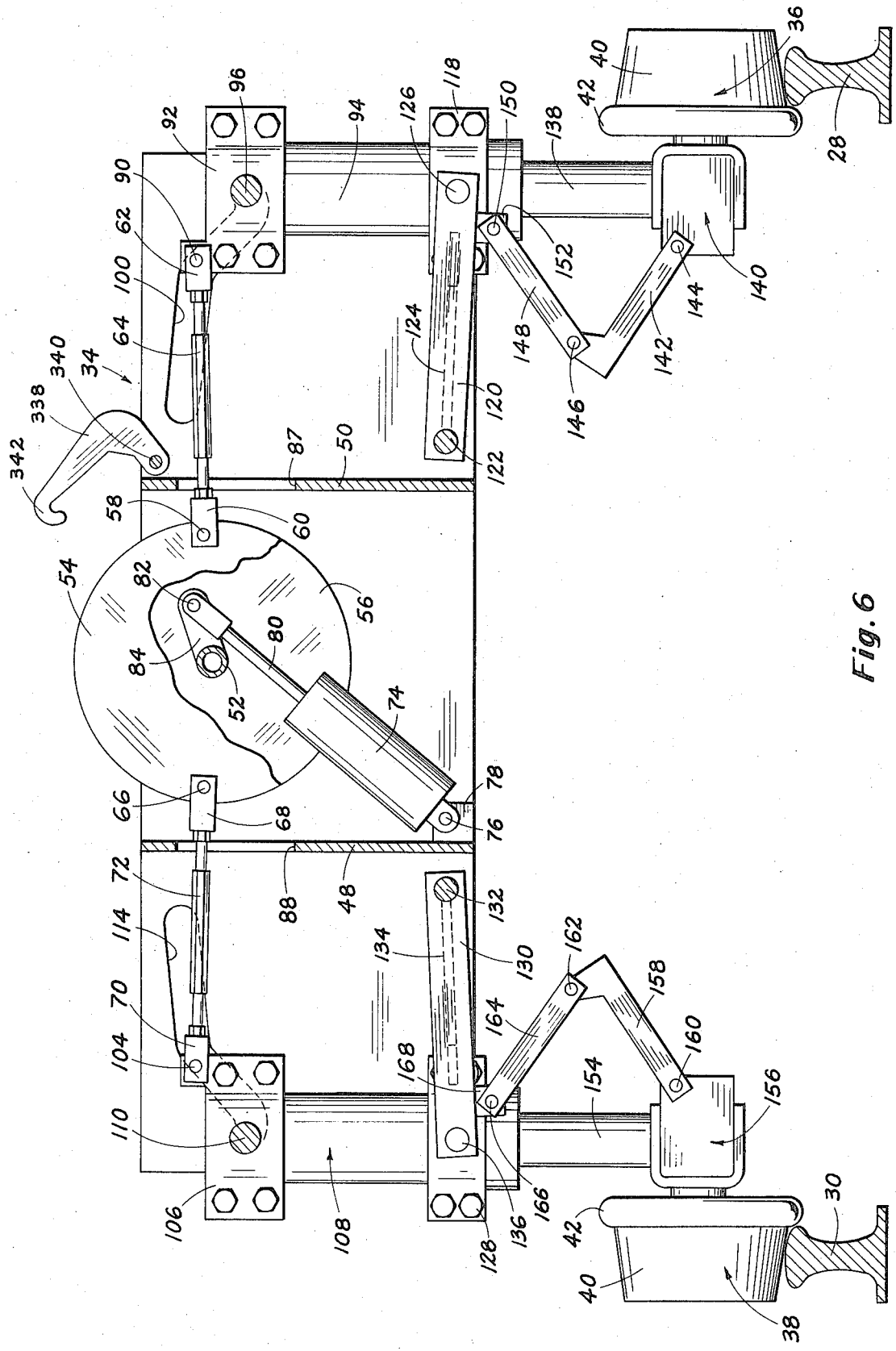
FIG. 6 is a front elevational view of the mounting assembly for retractable steel guide wheels embodying the invention and depicting the wheels in the extended or lowered position.

Referring now more particularly to FIGS. 6, 7 and 8, the wheels 36 and 38 are shown in the lowered or guiding position in FIG. 6 and in the raised or retracted position in FIG. 7.

Figure 9:
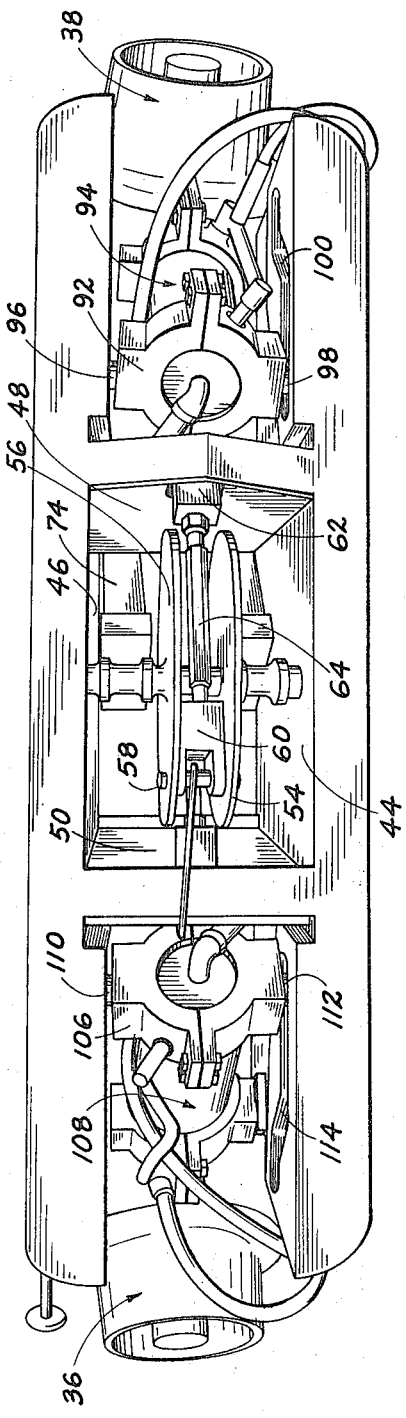
FIG. 9 is a top perspective view of a steel guide wheel assembly embodying the invention.

Referring now more particularly to FIGS. 6, 7, 8 and 9, the guide wheel assembly 34 comprises a pair of spaced substantially mutually parallel support plates 44 and 46 secured to the vehicle 10 in a manner as will be hereinafter set forth. A pair of spaced web members 48 and 50 are bolted or otherwise secured between the plates 44 and 46 for maintaining the plates 44 and 46 in said spaced relationship. A rod or shaft 52 is suitably secured between the plates 44 and 46 and is preferably substantially centrally disposed between the outer extremities or ends of the plates 44 and 46, as clearly shown in the drawings. A pair of spaced discs 54 and 56 are suitably journalled on the shaft 52 for rotation with respect thereto, and are preferably centrally disposed between the support plates 44 and 46 as shown in FIG. 9. A first rod member 58 is suitably secured between the discs 54 and 56 for pivotally receiving a clevis member 60 which is interposed between the plates 54 and 56. The clevis member 60 is connected with a pivotal block member 62 in any suitable manner, such as by a turnbuckle assembly 64, or the like, for a purpose as will be hereinafter set forth. A second rod 66 is similarly secured between the discs 54 and 56 for pivotally receiving a clevis member 68 which is secured to a pivotal block 70 by a turnbuckle assembly 72, or the like.

A first fluid actuated cylinder 74 has the outer housing thereof pivotally secured at 76 to a bracket member 78 which is welded or otherwise suitably secured to the web 48. The outer end of the piston rod 80 of the cylinder 74 is pivotally secured to a pin 82 secured to a connector arm 84 which in turn is suitably journalled on the shaft 52 and secured to the disc 46 for transmitting rotational motion thereto upon reciprocation of the piston rod 80. A second cylinder 86 (FIG. 9) substantially identical to the cylinder 74 is similarly secured to the disc 54 for transmitting rotational motion thereto upon actuation of the cylinder 86 for a purpose and in a manner as will be hereinafter set forth.

The turnbuckle assemblies 64 and 72 extend substantially radially outwardly from opposite sides of the discs 54 and 56 and pass through openings or apertures 87 and 88, respectively, provided in the webs 50 and 48, respectively. The block 62 is pivotally secured at 90 to a split collar member 92 which is bolted around or otherwise suitably secured around the outer periphery of one end of a fluid actuated cylinder 94. The collar 92 is provided with oppositely disposed outwardly extending guide pin members 96 and 98 (FIG. 9) which ride in a pair of aligned guide slots 100, one of which is provided for each support plate 44 and 46 in the proximity of the cylinder 94. The block 70 is pivotally secured at 104 to a split collar 106 bolted around or otherwise secured to one end of a fluid actuated cylinder 108. The collar 106 is provided with oppositely disposed outwardly extending guide pins 110 and 112 which ride in a pair of aligned guide slots 114, one of which is provided for each support plate 44 and 46 in the proximity of the cylinder 108.

The guide slots 100 and 114 are substantially identical and only the slot 114 will be described in detail herein. As particularly shown in FIG. 8, the slot 114 is provided in a plate 116 one of which is bolted or otherwise secured to each support plate 44 and 46 in the proximity of the cylinder 94, and one of which is bolted or otherwise secured to the support plates 44 and 46 in the proximity of the cylinder 108. The slot 114 comprises a first substantially straight portion 114a which is slightly angularly disposed with respect to the horizontal, and a second substantially straight portion 114b which is disposed at an angle with respect to the portion 114a. The angle between the two portions 114a and 114b is selected in order to provide the most efficient operation of the guide wheel apparatus 34, as will be hereinafter set forth. The slot portion 114b terminates in a bulbous portion 114c which is somewhat upturned with respect to the portion 114b. It will be apparent that the closed end of portion 114a limits the travel of the respective guide pin in one direction, and the closed end of the portion 114c limits the travel of the guide pin in the opposite direction.

As the cylinders 74 and 86 are actuated for extending or withdrawing the respective piston rods, the discs 54 and 56 will be oscillated accordingly. This movement of the discs 54 and 56 transmits a reciprocal movement to the turn buckle assemblies 64 and 72, which in turn moves the pins 96 and 98 in the slots 100 and the pins 110 and 112 in the slots 114. When the discs 54 and 56 are positioned as shown in FIG. 7, the pins 110 and 112 will be disposed adjacent the closed end of the slot portion 114a, and the pins 96 and 98 will be disposed against the corresponding closed end of the slots 100. When the discs 54 and 56 are positioned as shown in FIG. 6, the pins 110 and 112 will be disposed against the closed end of the slot portion 114c, and the pins 96 and 98 will be disposed adjacent the corresponding closed end of the slots 100. When the guide pins are disposed against the closed ends of the slot portions 114a, as shown in FIG. 7, the cylinders 94 and 108 are disposed upwardly and at an angle with respect to both the vertical and horizontal, for a purpose as will be hereinafter set forth. When the guide pins are disposed against the closed ends of the slot portions 114c, as shown in FIG. 6, the cylinders 94 and 108 are disposed in a substantially vertical position for a purpose as will be hereinafter set forth.

A split collar 118, generally similar to the collar 92, is bolted or otherwise secured around the outer periphery of the cylinder 94 in spaced relationship to the collar 92. A pair of oppositely disposed brace plates 120 (only one of which is shown in FIGS. 6 and 7) are pivotally secured to a rod 122 which is secured between the support plates 44 and 46 in the proximity of the web member 50. The brace members 122 are spaced apart by a plate member 124 (shown in dotted lines in FIGS. 6 and 7) which is welded or otherwise secured to the brace members 122 and disposed perpendicularly with respect thereto. The outer ends of the braces 122 are pivotally secured to the opposite sides of the collar 118, as shown at 126. The plate 124 is provided with an arcuate recess (not shown) in the proximity of the collar 118 to provide clearance therefor during operation of the guide wheel assembly 34, as will be hereinafter set forth.

A split collar 128 similar to the collar 118 is bolted or otherwise secured around the outer periphery of the cylinder 108 and spaced from the collar 106. A pair of oppositely disposed brace plates 130 (only one of which is shown), similar to the brace members 120, are pivotally secured to a rod member 132 which is secured between the support plates 44 and 46 in the proximity of the web 48. The braces 130 are spaced apart by a plate 134 similar to the plate 124, and the outer extremities of the braces 130 are pivotally secured to the opposite sides of the collar 128 as shown at 136.

As the cylinders 94 and 108 are moved from the angular position shown in FIG. 7 to the vertical position shown in FIG. 6, and alternately from the vertical position to the angular position, the brace members 120 and 130 cooperate with the collars 118 and 128 for facilitating the manipulation of the cylinders and providing rigidity and strength therefor during actuation of the assembly 34.

The cylinder 94 is provided with the usual reciprocal piston rod member 138 which is provided with a suitable connection member 140 on the outer end thereof for engagement with the steel guide wheel 36 in any well known manner. The connection block member 140 is suitably connected with the brace members 120 in any well known manner, and as shown in FIGS. 6 and 7, the connection comprises a substantially V-shaped link member 142 having the spaced ends thereof pivotally secured to the block 140 at 144. The opposite end of the link member 142 is pivotally secured at 146 to a clevis member 148, which in turn is pivotally secured at 150 to a pair of outwardly extending tabs 152 (only one of which is shown) one of which is secured to each of the brace members 120.

The cylinder 108 is similarly provided with the usual reciprocal piston rod 154 having a connection block 156 secured to the outer end thereof for connection with the steel guide wheel 38 in any well known manner. The connection block 156 is secured to the brace members 130 in any suitable manner, and as shown in FIGS. 6 and 7, the connection comprises a substantially V-shaped link member 158 similar to the link member 142 and having the spaced ends thereof pivotally secured to the connection block 156 at 160. The opposite end of the link 158 is pivotally secured at 162 to a clevis member 164 which has the opposite ends thereof pivotally secured at 166 to a pair of tabs 168 (only one of which is shown in FIGS. 6 and 7), one of which is secured to each of the brace members 130. The tabs 152 and 168 are secured to the respective brace members 120 and 130 in the proximity of the collars 118 and 128, respectively.

A modified connection arrangement between the connection blocks 140 and 156 and the respective brace members 120 and 130 is shown in FIG. 15. Both connection arrangements are substantially identical and only the modified connection between the connection block 156 and the brace members 130 will be described in detail. The connection comprises a substantially V-shaped link member 170 similar to the link member 158, and having the spaced ends thereof pivotally secured at 172 to the opposite sides of the block 156. The outer or opposite end of the link 170 is pivotally secured at 174 to a clevis member 176 generally similar to the clevis 164. However, the opposite ends of the clevis 176 are pivotally secured at 178 to a pair of outwardly extending tab members 180 (only one of which is shown in FIG. 15) one of which is secured to each of the brace members 130 in the proximity of the rod 132.

Figure 10:
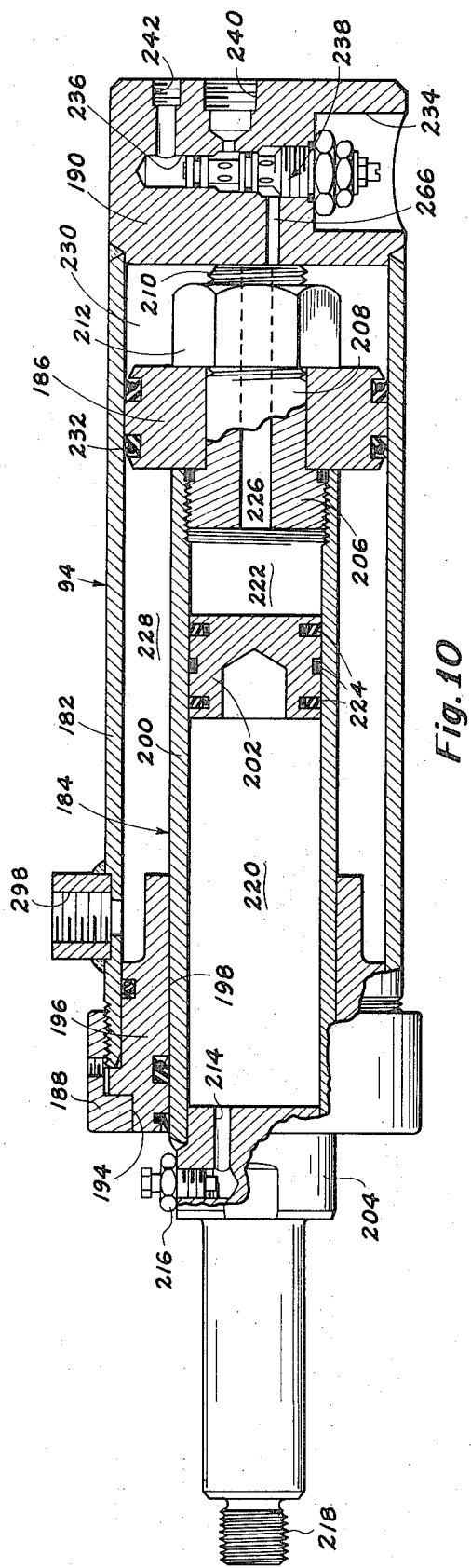
FIG. 10 is a sectional view of a hydraulic cylinder for controlling the operation of a guide wheel.

The cylinders 94 and 108 are substantially identical and only the cylinder 94 will be described in detail herein. Referring now to FIG. 10, the cylinder 94 may be of any suitable type having an outer housing 182 with a reciprocal piston rod 184 and piston head 186 carried thereby. However, as shown herein the outer housing 182 is provided with a cap member 188 threadedly secured at one end thereof and a block member 190 provided at the opposite end thereof. The cap member 188 is provided with a central aperture 194 for receiving a guide sleeve 196 therein which is provided with a central bore 198 for slidably receiving the piston rod 184 therethrough.

The piston rod 184 comprises a sleeve 200 having a freely slidably piston member 202 disposed therein. One end of the sleeve 200 is closed by a plug member 204 welded or otherwise secured thereto and the opposite end of the sleeve 200 is closed by a plug member 206 threadedly secured thereto. The plug member 206 extends axially beyond the sleeve 200 and is provided with a reduced neck portion 208 having the piston head 186 disposed therearound. The neck 208 is threaded as shown at 210 for receiving a nut 212 for securing the piston head 186 in position on the neck 208. The plug 204 is provided with an angled passageway 214 providing communication between the exterior of the plug and the interior of the sleeve 200. A suitable fitting 216 is removably secured to the angled passageway 214 for selectively providing access to the interior of the sleeve 200 for a purpose as will be hereinafter set forth. The outer extremity of the piston rod 182 may be threaded as shown at 218 for facilitating connection with the connection block 140, as is well known.

The floating piston 202 within the sleeve 200 divides the interior of the sleeve into two separate compartments 220 and 222, and suitable sealing members 224 are provided on the outer periphery of the piston 202 for precluding leakage of fluid therearound. A suitable gaseous fluid is preloaded into the chamber 220 through the passageway 214 to provide a preselected pressure acting against one end of the piston 202 for a purpose as will be hereinafter set forth. A suitable hydraulic fluid is preloaded into the chamber 222 through a central passageway 226 provided in the plug 206 in a manner as will be hereinafter set forth. The piston head 186 separates the annular chamber 228 between the piston rod 184 and sleeve 182 from the chamber 230 adjacent the plug member 190. Suitable sealing members 232 are provided around the outer periphery of the piston head 186 for precluding leakage of fluid therearound.

Figure 11:
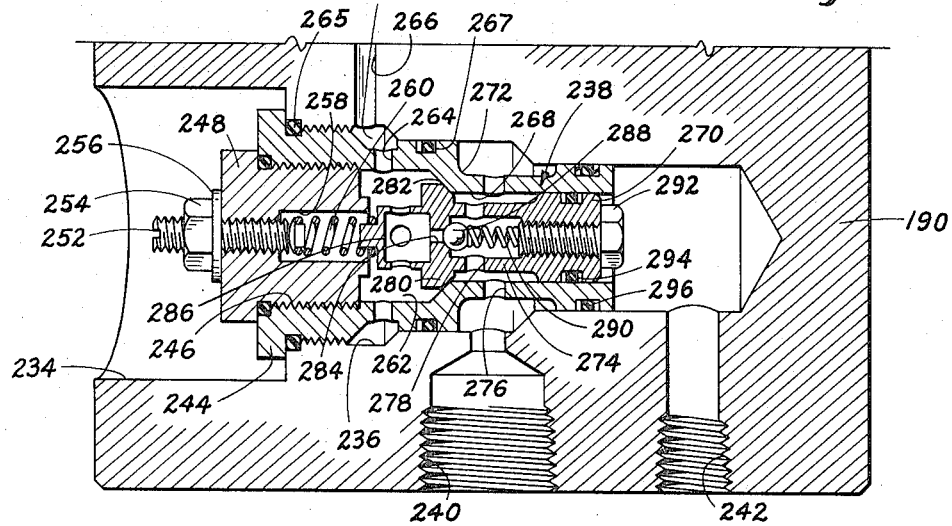
FIG. 11 is an enlarged broken sectional view of one end of the cylinder shown in FIG. 10 with the cylinder being depicted in an inverted position for purposes of illustration of the accumulator valve assembly mounted therein.

As more particularly shown in FIGS. 10 and 11, the plug member 190 is provided with a transversely extending bore 234 which is reduced at 236 and for receiving a valve assembly 238 therein. A substantially centrally disposed longitudinally extending bore 240 is provided in the plug 190 and extends into communication with the reduced bore portion 236. A second longitudinally extending bore 242, spaced from the bore 240, is also provided in the plug 190 and extends into communication with the reduced bore portion 236 beyond the valve assembly 238 for a purpose as will be hereinafter set forth.

The valve assembly 238 comprises an externally threaded flanged sleeve 244 threadedly secured in the bore 236 and having an internal threaded bore 246 for receiving a flanged end plug member 248 therein. The end plug 248 is provided with a central bore 250 for receiving a threaded stem 252 therein having a suitable lock nut 254 and washer 246 for retaining the stem 252 in the bore 250 at substantially any desired position therebetween. The bore 250 is enlarged at 258 for receiving an adjustment spring 260 therein as will be hereinafter set forth. An internal chamber 262 is provided in the sleeve 244 in the proximity of the inner end of the plug 248 and a plurality of circumferentially spaced radially extending bores 264 are provided in the sleeve 244 in the area of the chamber 262 for providing communication between the chamber 262 and an annular recess 263 provided on the outer periphery of the sleeve 244. The recess 263 is in communication with a longitudinally extending passageway 266 provided in the plug 190 and extending from the bore portion 236 into communication with the chamber 230. Suitable sealing members 265 and 267 are disposed on the outer periphery of the sleeve 244 on opposite sides of the recess 263.

The internal bore 246 of the sleeve 244 is reduced at 268 for slidably receiving a valve insert member 270 therein. The outer periphery of the sleeve 244 is reduced at 272 to provide an annular chamber between the sleeve 244 and bore portion 236. The outer periphery of the insert member 270 is also reduced at 274 in the proximity of the recess 272, and a plurality of circumferentially spaced bores 276 are provided in the sleeve 244 to provide communication between the chamber 274 and the chamber 272. In addition, a plurality of circumferentially spaced bores 278 are provided in the insert member 270 to provide communication between the chamber 274 and the interior of the insert 270.

The insert member 270 is enlarged at 280 for cooperation with an internal valve seal 282 provided in the sleeve 244 for providing alternate opened and closed positions for the valve 238. A central bore 284 is provided in the enlarged portion 280 to provide communication between the interior of the insert 270 and the interior of a ported cage member 286 which is carried by or integral with the enlarged portion 280. The cage member 286 functions to provide communication between the bore 284 and the chamber 262, and also receives one end of the adjustment spring 260 for retaining the spring 260 against the adjustment screw 252 for a purpose as will be hereinafter set forth.

A ball member 288 is disposed within the insert member 270 and is held in normal engagement with the bore 284 by a spring member 290 which is held against the ball 288 by a threaded stud 292 secured to the insert 270 and extending longitudinally therein. A suitable sealing member 294 is interposed between the insert member 270 and the internal bore of the sleeve 244 in the proximity of the threaded stud member 292 for precluding leakage of fluid therebetween, and a suitable sealing member 296 is provided around the outer periphery of the sleeve 244 in the proximity of the right hand end thereof as viewed in FIG. 11 to cooperate with the seal member 267 to seal off the annular chamber 272 against leakage of fluid.

The pressure of the spring 260 against the cage member 286 constantly urges the enlarged portion 280 in a right hand direction as viewed in FIG. 11 for maintaining the enlarged portion 280 in a closed position against the valve seat 282. Of course, the force of the spring 260 may be adjusted by the threaded adjustment screw 252, as is well known. The pressure of the spring against the ball 288 constantly urges the ball 288 against the bore 284 for maintaining the ball 288 in a closed position. In order to charge the chamber 222 with a preselected fluid pressure, suitable hydraulic fluid is directed to the bore portion 236 through the bore 242. When the pressure of the fluid in the bore portion 236 and acting against the exposed end of the valve insert member 270 exceeds the pressure of the spring 260, the insert member 270 moves in a left hand direction in the bore 236, as viewed in FIG. 11, for moving the enlarged portion 280 out of engagement with the valve seat 282, thus opening the valve 238 and permitting fluid to flow from the bore 240, through the open valve port 282 and to the passageway 226 for discharge into the interior of the cylinder 94 in a manner and for a purpose as will be hereinafter set forth. When the pressure of the fluid within the cylinder 94 exceeds the pressure of the spring 290, the ball 288 will move away from the port 284, thus permitting fluid to flow from the chamber 262 through the cage 286 and through the port 284 for discharge through the bore 240, for a purpose and in a manner as will be hereinafter set forth.

A port 298 (FIG. 10) is provided in the outer sleeve 182 of the cylinder 94 and oppositely disposed with respect to the plug member 190 for providing communication between the exterior of the sleeve 182 and the annular chamber 228 therein. It will be apparent that the application of fluid pressure into the chamber 228 in excess of the fluid pressure in the chamber 230 will cause the piston head 186 and piston rod 184 to retract or to move in a right hand direction as viewed in FIG. 10. Alternately, the application of fluid pressure into the chamber 230 in excess of the fluid pressure in the chamber 228 will cause the piston 186 and rod 184 to extend or move in a left hand direction as viewed in FIG. 10. Thus, for reciprocation of the piston head 186 fluid is alternately directed to the port 298 for filling the chamber 228 while simultaneously withdrawn from the chamber 230 through the port 240; then directed to the port 240 for filling the chamber 230 while simultaneously withdrawn from the chamber 228 through the port 298.

The chamber 222 in the piston rod 184 taken in combination with the valve assembly 238 provides an integral accumulator for the cylinder 94, thus each wheel actuating cylinder in the system is provided with its own integral accumulator for a purpose as will be hereinafter set forth. In order to prepare the cylinder 94 for use in the system of the invention, a suitable compressible gaseous fluid is introduced into the chamber 220 through the passageway 214 to preload the chamber 220 with a desired fluid pressure, for example 600 p.s.i. Hydraulic fluid is then applied through the port 242 for opening the valve port 282 whereby hydraulic fluid directed through the port 240 may be directed through the open valve 238 and into the passageway 266 for discharge into the chamber 222 through the passageway 226. The chamber 222 is filled with the hydraulic fluid until the pressures acting on the opposite side of the floating piston 202 are equalized, thus providing a stabilized position for the piston 202 within the sleeve 200. This assures an adequate fluid reservoir for the chamber 230 during any emergency operation of the cylinder 94 wherein fluid is accidentally lost from the chamber 230 during an extended position operation for the piston rod 184, as will be hereinafter set forth.

Figure 5:
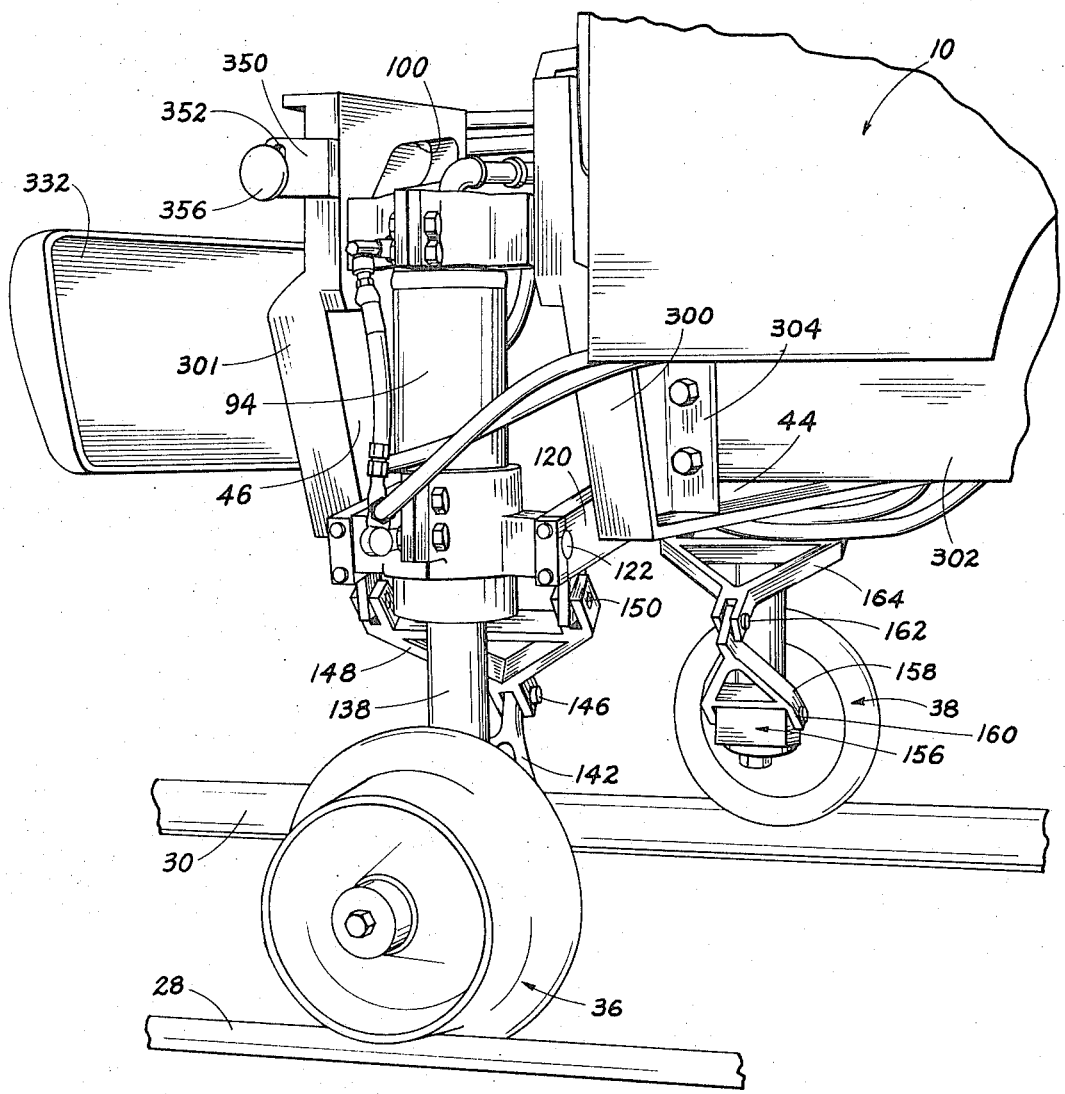
FIG. 5 is a perspective view of the front guide wheel assembly mounted on a vehicle, and illustrating the guide wheels in the lowered position.

Referring now to FIGS. 5 and 13, the support plates 44 and 46 of the guide wheel assembly 34 are each provided with a peripheral frame portion 300 and 301, respectively, extending outwardly therefrom in opposite directions. The guide wheel assembly 34 may be connected with the frame 302 of the vehicle 10 in any suitable manner, such as by suitably spaced plate members 304 (only one of which is shown in FIG. 5) welded or otherwise secured to the support plate 44 and frame portion 300 which are bolted or otherwise secured directly to the frame 302. In addition, a plate member 306 (FIG. 13) is bolted or otherwise secured to the upper arm member 308 of each of the usual spring suspension assemblies normally provided for each front wheels 18 and 20 of the vehicle 10. The arm 308 is normally either integral with or rigidly secured to the vehicle frame 302 for movement simultaneously therewith.

The suspension assembly 310 further normally comprises a movable or reciprocal support arm 312 spaced below the arm 308 for yieldably supporting a suspension spring 314 therebetween. The arm 312 is normally connected with the respective vehicle wheel (not shown in FIG. 13) by a suitable spindle 316, as is well known, for vertical movement simultaneously with the wheel whereby the spring 314 absorbs most of the shock as the wheel rolls or moves over uneven terrain.

A plate member 318 is suitably secured to the underside of the movable arm 312 and is provided with a pair of spaced notches or recesses 320 and 322 for slidably receiving a pair of spaced rods 324 and 326, respectively, therethrough. The rods 324 and 326 are journalled in the plate 306 in any suitable manner (not shown) for rotation about their own longitudinal axes, but are retained against longitudinal movement with respect to the plate 306. The rods 324 and 326 are provided with a radially outwardly extending tab 328 and 330, respectively, disposed in the proximity of the lower ends thereof, and spaced below the plate 318 in the normal uncompressed position for the spring 314 as shown in FIG. 13. The upper end of the rods 324 and 326 extend beyond the plate 306 and are tied together or connected in any suitable or well known manner (not shown) whereby rotational movement of the rods 324 and 326 is simultaneous and synchronized. Any suitable means may be provided for transmitting rotation to the rods 324 and 326, such as a hydraulic cylinder (not shown) connected with the hydraulic fluid system of the invention, as will be hereinafter set forth.

In the normal highway or road use for the vehicle 10, the rods 324 and 326 are preferably positioned as shown in FIG. 13 wherein the tab members 328 and 330 are spaced below the plate 318, and are turned outwardly with respect thereto to avoid any possible engagement between the tabs and the plate 318 during normal operation of the suspension assembly 310 for absorbing the shock of the wheels 18 and 20 moving along rough or uneven terrain. However, when the steel guide wheel assembly 34 is to be utilized for facilitating the travel of the vehicle 10 along the rails 28 and 30, as will be hereinafter set forth, the rods 324 and 326 are simultaneously rotated for moving the tabs 328 and 330 into a position in substantial alignment with the plate 318 whereby upward movement of the plate 306 through a sufficient distance will raise the tabs into engagement with the plate 318, and subsequent upward movement of the plate 306 will raise the plate 318 and arm 320 simultaneously therewith. It will be apparent that upward movement of the arm 320 will lift the respective vehicle wheel to remove the wheel from engagement with the respective rail, as will be hereinafter set forth.

Figure 2:
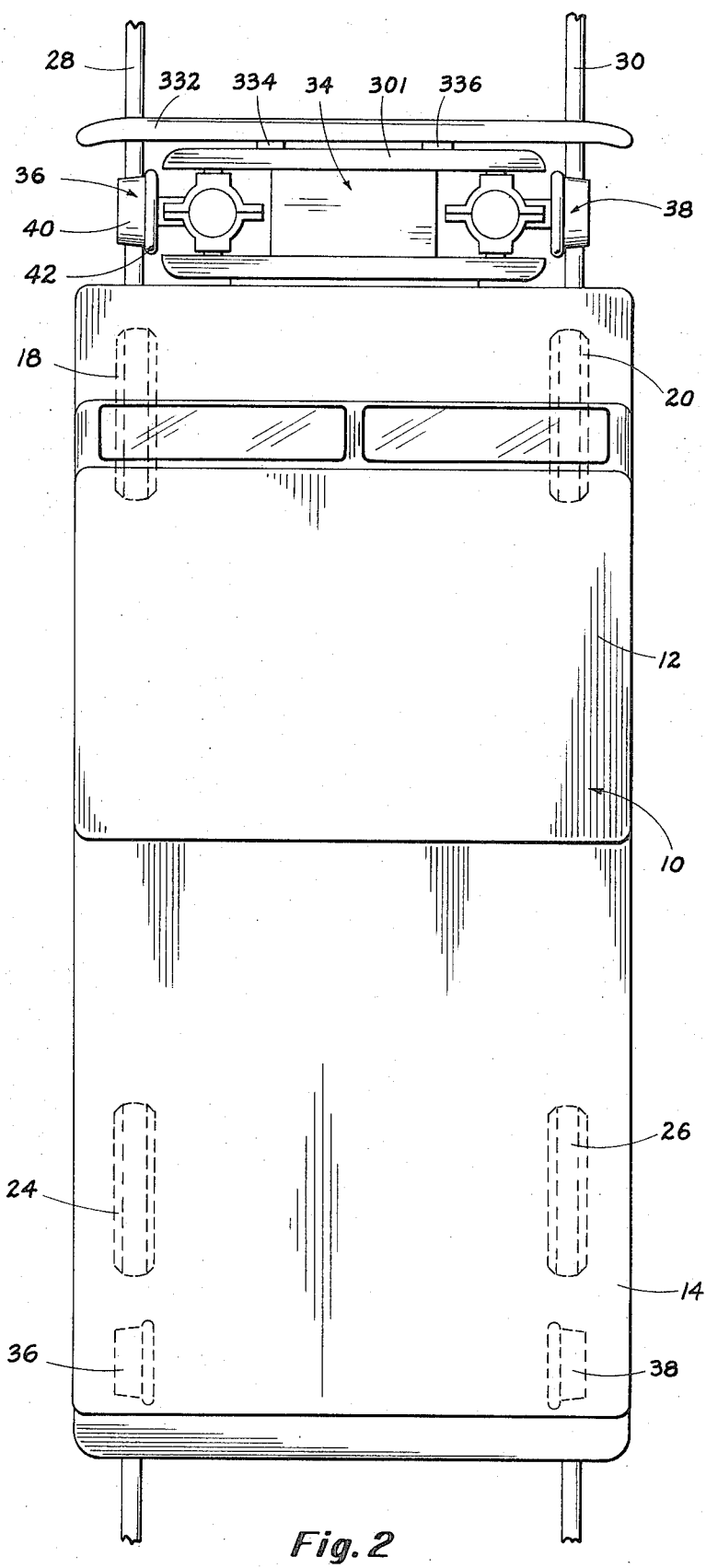
FIG. 2 is a plan view of a pneumatic tired convertible rail-highway vehicle illustrating the four corner support arrangement of the guide wheels of the invention.
Figure 3:
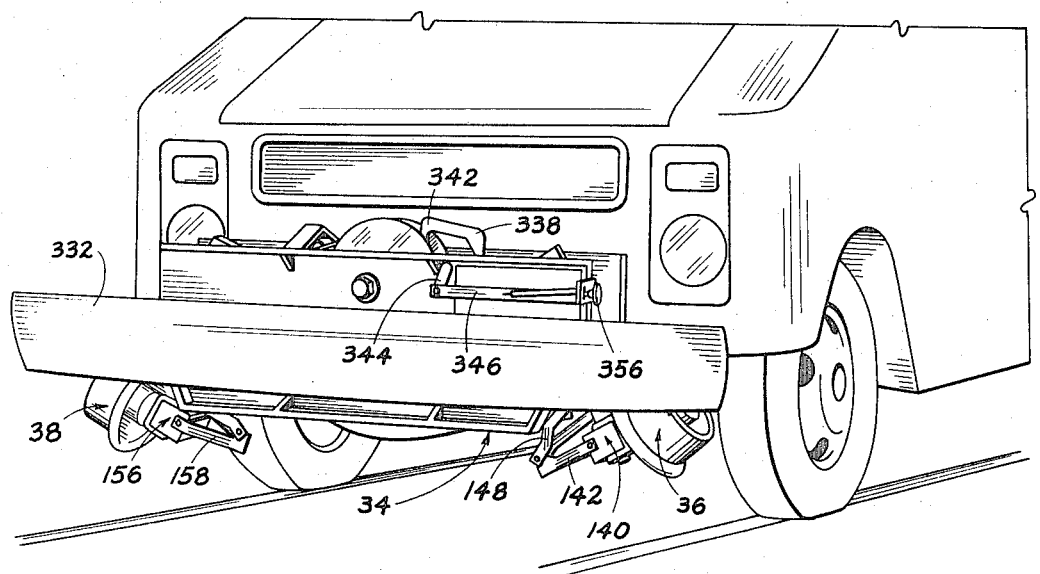
FIG. 3 is a perspective view of the front portion of the vehicle shown in FIG. 1 and depicting the steel guide wheels in the elevated or retracted position therefor.

As shown in the drawings and particularly in FIGS. 2, 5 and 9, a suitable bumper member 332 is rigidly secured to the support plate 46 in any well known manner, such as by spaced heavy duty bracket members 334 and 336 welded or otherwise secured to the support plate 46 and peripheral member 301. It is to be noted that in some instances, welding of the bumper brackets 334 and 326 to the plate 46 and peripheral member 301 causes warping of the plate 46, which is a disadvantage in that the proper efficient operation of the guide wheel assembly 34 may be hampered if the plate 46 is distorted. Similarly, welding of the frame securing plates 304 to the plate 44 and peripheral member 300 may cause warping of the plate 44, which is a disadvantage. Accordingly, it may be preferable to bolt the elements to the assembly 34 rather than utilize a welding operation. In addition, as hereinbefore set forth, a guide wheel assembly 34 is provided for both the front and rear of the vehicle 10, and it will be readily apparent that the bumper 332 of each assembly 34 provides front and rear bumpers for the vehicle 10 both during road use and rail use. Furthermore, it is not usually necessary to provide the plate 306, plate 318, rods 324 and 326 and tabs 328 and 330 for the suspension 320 of the rear wheels 24 and 26 of the vehicle 10 since during the rail operation of the vehicle the rear wheels 24 and 26 are normally in engagement with the respective rails 28 and 30, as will be hereinafter set forth.

Any suitable means may be provided for locking or retaining the discs 54 and 56 in either the position shown in FIG. 6 or FIG. 7 to preclude accidental movement of the wheels 38 and 40 from this position during use of the vehicle 10 for road or rail travel. As shown in FIGS. 3, 4, 6, 7 and 9, the particular locking device depicted herein comprises a pawl member 338 carried by or secured to a rod member 340 which is suitably journalled between the plates 44 and 46. The pawl 338 is provided with a hook-like member 342 on the outer end thereof for selective engagement with the rod 66 in the rod 58. The rod 340 extends beyond the outer surface of the plate 46 and a crank arm 344 is suitably secured to the outer end of the rod 66 for transmitting rotation thereto. A lever arm 346 has one end pivotally secured at 348 to the outer end of the crank arm 344 and extends beyond a flange 350 secured to the outer edge of the plate 46 (or secured to the peripheral member 301 as shown in FIG. 5), and through a slot 352 (FIG. 5) provided in the flange 350. A tension spring 354 is suitably secured or anchored between the lever arm 346 and the flange 350 for constantly urging the lever 346 in a direction toward the flange 350. A suitable knob 356 is secured to the outer end of the lever 346 by a rod member 358.

The spring 354 constantly urges the lever 346 in a direction toward the flange 350 whereby the crank arm 344 is normally pivoted in a direction whereby the rod 340 is rotated in a direction to maintain the hook end 342 of the pawl 338 engaged with the rod 66, or the rod 58, depending upon the position of the discs 54 and 56. When it is desired to disengage the pawl 338 from engagement with the rod 66 or rod 58 as shown in FIG. 6, the knob 356 may be manually pushed in a direction toward the pawl 338 whereby the lever 346 is moved against the action of the spring 354, thus pivoting the crank arm 340 and rod 340 in an opposite direction from the normal direction of rotation thereof to disengage the pawl. The rod 358 may be lowered in the slot 352 whereby the lever 346 will be maintained in the position for holding the pawl 338 in the disengaged position until such time as it is desired to re-engage the pawl with one of the rods 66 or 58. The knob 356 may then be grasped for lifting the rod 358 in the slot 352 and manually pulling the lever in a direction toward the flange 350 and through the slot 352 for maintaining the pawl in the engaged or locking position thereof.

It is to be noted that the discs 54 and 56 may be eliminated, if desired. In this instance, the piston rod 80 of the cylinder 74 may be pivotally connected directly to the block 60 of the turnbuckle assembly 64 and the turnbuckle assembly 64 is rigidly secured to the upper collar 92 of the cylinder 94. In this manner, reciprocation of the piston rod 80 will move the pins 96 and 98 in the slots 100 as hereinbefore set forth. Of course, the cylinder 86 may be similarly connected with the turnbuckle assembly 72, and the turnbuckle 72 rigidly connected with the collar 106 of the cylinder 108 whereby reciprocal movement of the piston rod of the cylinder 86 moves the pins 110 and 112 in the slots 114 as hereinbefore set forth.

Figure 12:
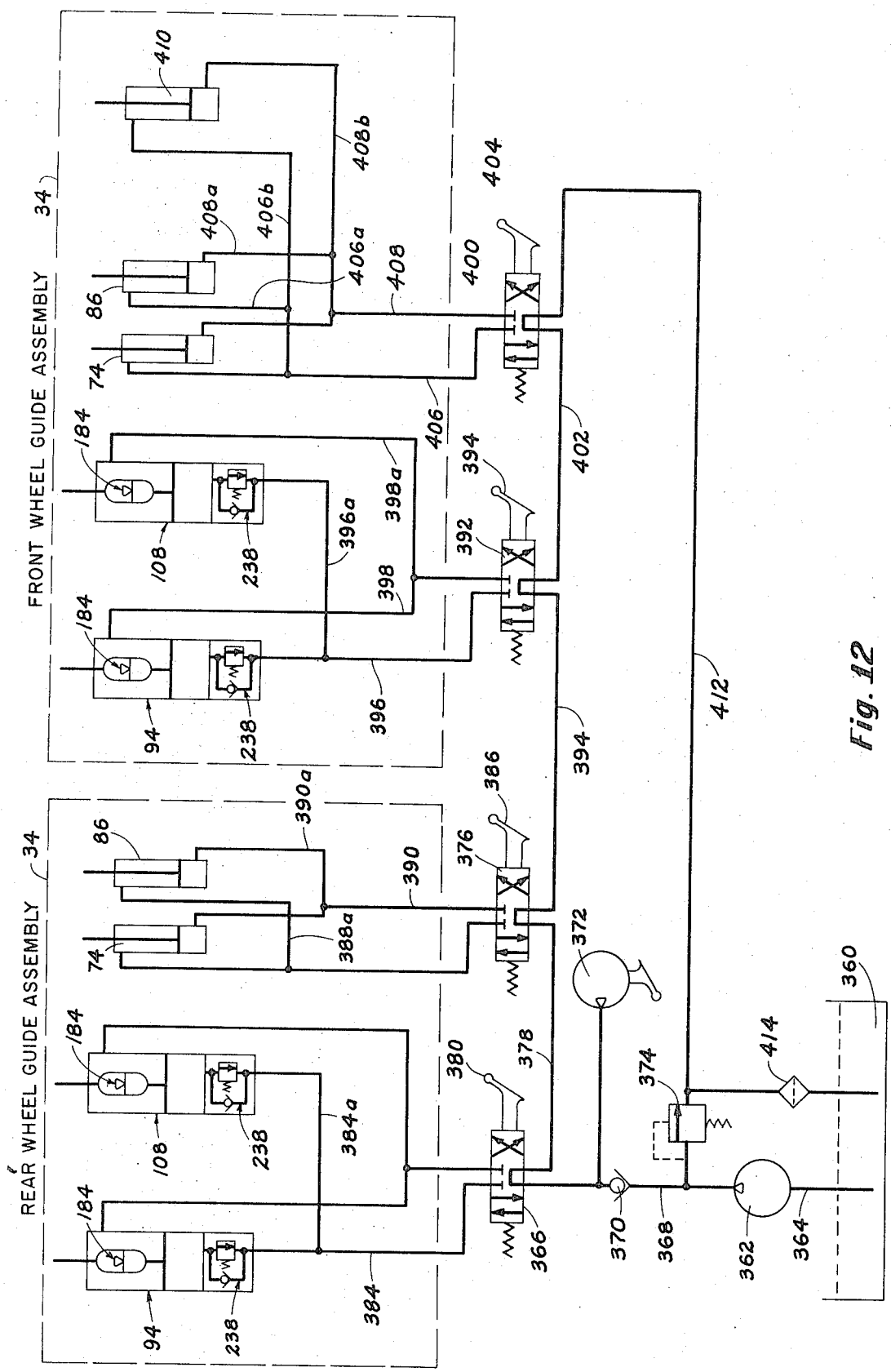
FIG. 12 is a schematic view of the hydraulic system for the actuation of the guide wheel assembly embodying the invention.

Referring now to FIG. 12, this figure depicts a schematic hydraulic circuit for operation of the guide assemblies 34 provided on the vehicle 10. As hereinbefore set forth, a guide assembly 34 is provided for both the front and rear of the vehicle 10 and in association with the front wheels 18 and 20 and rear wheels 24 and 26 thereof. The steel guide wheel 36 of each assembly 34 is provided with its own independent cylinder 94 and the steel guide wheel 38 of each assembly 34 is provided with its own independent cylinder 108. Since there are four steel guide wheels provided for the vehicle 10, it will be apparent that there are four cylinders of the type shown in FIG. 10 provided on the vehicle 10. A fluid reservoir 360 is provided in the hydraulic system for operation of the assemblies 34 and may be suitably mounted as desired on the vehicle 10, as is well known. A suitable pump 362 is connected with the reservoir through a suitable conduit 364 as is well known for withdrawing the fluid from the reservoir and circulating the fluid through the hydraulic system. The pump 362 may be of any well known or suitable type, and is preferably a fixed displacement pump of the D14 series for delivering four and one-half gallons per minute at a speed of 3600 rpm, at 500 p.s.i. The pump 362 is connected with a suitable valve 366 by a conduit or hydraulic line 368 and a check valve 370 is interposed in the line 368 for precluding backflow of the fluid into the pump 362. In addition, an emergency hand pump 372 is interposed in the line 368 for emergency operation of the hydraulic system in the event of failure of the pump 362. A suitable relief valve 374 is also interposed in the line 368.

The valve 366 may be any suitable type and as shown schematically herein is a suitable spool type valve having the spool member thereof spring urged in a manner to provide a normal neutral or centered position for the spool wherein fluid is not passed through the valve, but is simply circulated through the valve 366 and passed on to a second valve 376, which is connected with the valve 366 by a suitable conduit or hydraulic line 378. The valve 366 is operably connected with a switch 380 which may be mounted in the cab portion 12 of the vehicle 10 or may be mounted exteriorly of the cab portion 12, such as in a compartment (not shown) behind a hinged access door 382 provided on the side of the vehicle 10. One outlet port of the valve 366 is cnnected with the valve 238 of each cylinder 94 and 108 of the guide wheel assembly 34 provided on the rear of the vehicle 10 by conduits 384 and 384a. The other outlet port of the valve 366 is connected within the port 298 of each cylinder 94 and 108 of the rear guide wheel assembly 34. Thus, in one "open" position of the valve 366, hydraulic fluid will be directed to the valves 238 of the cylinders 94 and 108 and withdrawn through the ports 298, and in another "open" position for the valve, fluid will be withdrawn from the valves 238 and directed to the ports 298.

The valve 376 is substantially identical to the valve 366 and is operably connected with a switch 386 mounted on the vehicle 10 in the proximity of the switch 380 for convenience of operation of the hydraulic system. One outlet port of the valve 376 is connected with the rod end of both of the cylinders 74 and 86 of the rear guide wheel assembly 34 by conduits 388 and 388a, and the other outlet port of the valve 376 is similarly connected with the piston head end of each cylinder 74 and 86 of the rear guide wheel assembly 34 by conduits 390 and 390a.

The valve 376 is connected with a valve 392 by a conduit or hydraulic line 394. The valve 392 is substantially identical to the valves 366 and 376 and is operably connected with a switch 394 which is preferably suitably mounted on the vehicle 10 in the proximity of the switches 380 and 386. One outlet port of the valve 392 is connected with the valves 238 of each of the cylinders 94 and 108 of the guide wheel assembly 34 mounted on the front of the vehicle by suitable conduits 396 and 396a. The other outlet port of the valve 392 is connected with the port 298 of each of the cylinders 94 and 108 of the front guide wheel assembly 34 through conduits 398 and 398a.

The valve 392 is connected with a valve 400 by a suitable conduit or hydraulic line 402. The valve 400 is substantially identical to the valves 366, 376 and 392 and is operably connected with a switch 404 which is preferably mounted of the vehicle 10 in the proximity of the switches 380, 386 and 394 for convenience of operation of the hydraulic system. One outlet port of the valve 400 is connected with the rod end of each of the cylinders 74 and 86 of the front guide wheel assembly 34 by conduits 406 and 406a, and the other outlet port of the valve 400 is similarly connected with the piston head side of the cylinders 74 and 86 through conduits 408 and 408a. The first mentioned outlet port of the valve 400 is also connected with the rod end of actuating cylinder 410 of the wheel suspension 310 through a conduit 406b, and the second mentioned outlet port of the valve 400 is also connected with the piston head end of the cylinder 410 through a conduit 408b. Whereas only one cylinder 410 is shown in FIG. 12, it will be apparent that a separate cylinder 410 may be provided for the suspension 310 of each front wheel 18 and 20, if desired.

The valve 400 is connected with the fluid reservoir 360 by a conduit or hydraulic line 412, and a suitable return line filter 414 is interposed in the line 412 between the valve 400 and the reservoir 360 for assuring that the fluid returned to the reservoir will be clean for efficient recirculation through the hydraulic system.

When the vehicle 10 is to be driven along the rails 28 and 30, the vehicle 10 is driven onto the rails at a railway crossing or the like, not shown, in any well known manner wherein the pneumatic tired front wheels 18 and 20 and rear wheels 24 and 26 are disposed on the rails, and substantially aligned with respect thereto. The pump 362 may then be activated in any well known manner to withdraw the fluid from the reservoir 360 and discharge the fluid into the line 368 for circulation to the valves 366, 376, 392 and 400. Since all of the valves are in the normal centered position, the fluid will simply circulate through the system and return to the reservoir 360 through the return line 412 and filter 414.

The switch 404 may then be activated in the usual manner for moving the spool of the valve 400 in a left hand direction as viewed in FIG. 12 for directing the hydraulic fluid to the piston head end of the cylinders 74 and 86 of the front guide wheel assembly 34. This causes the piston rods of the cylinders 74 and 86 to be extended for rotating the discs 54 and 56 to the position shown in FIG. 6. As hereinbefore set forth, the extension of the rods of the pistons 74 and 86 results in movement of the pins 96 and 98 in the slots 100 and the pins 110 and 112 in the slots 114 in opposite directions for moving the cylinders 94 and 108 to vertical or upright positions as shown in FIG. 6. The application of fluid is simultaneously applied to the rod end of the suspension system actuator cylinder 410 for simultaneously rotating the rods 324 and 326 for placing the tabs 328 and 330 in position of alignment with the plate 318. Of course, the pawl 338 is disengaged from the locking position thereof prior to the activation of the switch 404 in order to permit the discs 54 and 56 to rotate during the pivotal or rotational movement of the cylinders 94 and 108 to the vertical position therefor. The pawl 338 may be replaced in the locking position therefor when the cylinders 94 and 108 have reached the desired vertical position.

When the rods of the cylinders 74 and 86 have completely extended the cylinders 94 and 108 will be in the vertical position, and the valve 400 will seek its normal neutral or central position whereby the cylinders 74 and 86 will be locked in the rod extended position and the fluid in the hydraulic system will be recirculated to the reservoir 360.

Subsequent to the rotating of the front cylinders 94 and 108 to the vertical position the switch 386 may be activated in the usual manner for moving the spool member of the valve 376 in a left hand direction as viewed in FIG. 12 to direct fluid to the piston head side of the cylinders 74 and 86 of the rear guide wheel assembly 34 for extending the piston rods of the cylinders 74 and 86 as hereinbefore set forth to rotate or pivot the cylinders 94 and 108 of the rear guide wheel assembly to the vertical position therefor. As hereinbefore set forth, the pawl 338 may be disengaged from the locking position thereof during the extending of the piston rods of the cylinders 74 and 86, and may be relocked subsequent to the full extension of the rods to maintain the cylinders 94 and 108 in the vertical position. When the rods of the cylinders 74 and 86 have reached the full extended position, the valve 376 will seek the neutral or centered position therefor and fluid will be recirculated through the hydraulic system as hereinbefore set forth.

The switch 394 may now be activated in the usual manner for moving the spool member of the valve 392 in a right hand direction as viewed in FIG. 12 to supply fluid to the valve 238 of the front assembly 34. As hereinbefore set forth, the piston sleeves 200 of the cylinders 94 and 108 have been preloaded to provide an accumulator in each cylinder prior to operation of the assemblies 34. Thus, application of fluid to the valve 238 as hereinbefore set forth directs fluid into the chamber 230 for moving the piston head 186 in a direction for extending the piston rod 184. Of course, the wheels 36 and 38 move downwardly as the piston rods 184 are extended. When the wheels 36 and 38 have moved downwardly through a sufficient distance, the outer peripheries 40 thereof will engage the rails 38 and 30, respectively. Since the wheels 36 and 38 can move downwardly no further, continued extension of the rods 184 will cause the vehicle frame 302 to elevate.

The rods 324 and 326 are moved upwardly simultaneously with the upward movement of the frame 302 for bringing the tabs 328 and 330 into engagement with the underside of the plate 318. As the rods continue to extend and continue to raise the frame 302, the plate 318 is raised for raising the arms 312 and thus raising the wheels 18 and 20 from engagement with the rails 28 and 30. When the rods 184 of the cylinders 94 and 108 have fully extended, the valve 392 will seek the neutral or central position thereof whereby the fluid will be recirculated to the reservoir 260.

It is preferable that the rods 184 have a stroke of six inches, but not limited thereto. It is also preferable that the tabs 328 and 330 engage the plate 318 subsequent to approximately a three inch travel of the piston, thus raising the wheels 18 and 20 approximately three inches above the rails 28 and 30, which appears to be an efficient position for the wheels 18 and 20 during travel of the vehicle 10 along the railway 32. it is also preferable that the wheels 18 and 20 be positioned in a straight ahead direction, but that is no need to provide any locking arrangement for locking the wheels in this straight ahead position. It is to be noted that the entire load of the front end of the vehicle 10 is supported by the hydraulic system and the front assembly wheels 36 and 38 when the vehicle wheels 18 and 20 are elevated from engagement with the rails.

As hereinbefore set forth, the cylinders 94 and 108 of the rear guide wheel assembly have been moved to the vertical position, and the steel guide wheels 36 and 38 are disposed in substantial alignment with and above the rails 28 and 30, respectively. The switch 380 may then be activated in the usual manner for moving the spool element of the valve 366 in a right hand direction as viewed in FIG. 12 for directing fluid to the valve 238 of the cylinders 94 and 108 for extending the rods 184 of each cylinder 94 and 108. When the wheels 36 and 28 are lowered sufficiently for engagement with the respective rails 28 and 30, no further downward movement of the wheels is possible, and as a result the frame 302 will move upwardly upon a continued extension of the rods 184. As hereinbefore set forth, there is no connection between the rear guide wheel assembly 34 and the suspension 310 of the rear vehicle wheels 24 and 26. Thus, the frame 302 may be moved through some distance without elevating the rear vehicle wheels 24 and 26 from engagement with the rails 28 and 30. When the rods 184 of the cylinders 94 and 108 have been fully extended, a predesired amount of weight will be lifted from the wheels 24 and 26, and only that desired weight will remain on the wheels 24 and 26 which is considered optimum for use of the rear wheels 24 and 26 for traction with the rails to drive and brake the vehicle during travel along the railway 32. The valve 366 will seek the neutral or centered position thereof when the pistons 184 "bottom out" or reach the fully extended position therefor, and the fluid will be recirculated in the hydraulic system.

It is preferable to maintain the pump 362 in operation during the entire time in which the vehicle 10 is utilized as a rail vehicle. Of course, the emergency hand pump 372 may be used in the normal manner for supplying fluid to the system in the event of failure of the pump 362.

Figure 4:
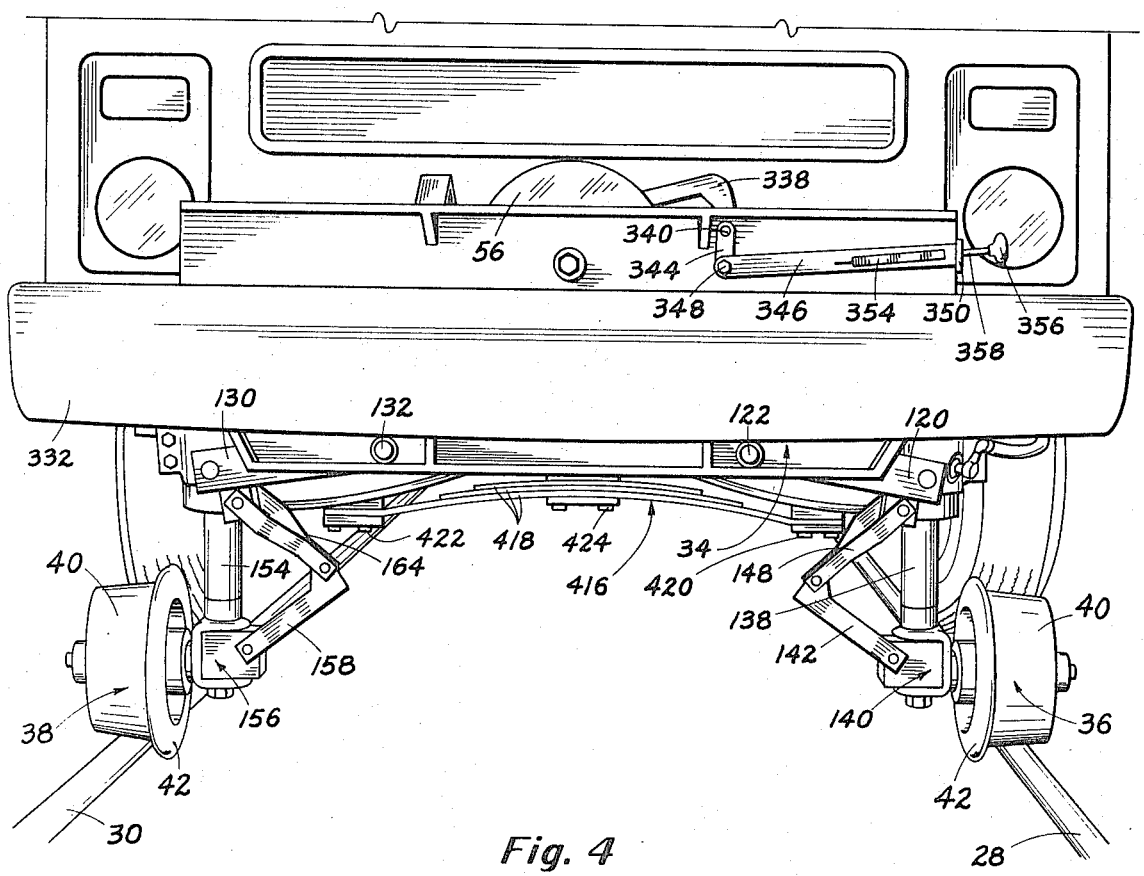
FIG. 4 is a front view of the vehicle shown in FIG. 1 and depicting the guide wheels in the lowered position therefor.

Referring now to FIG. 4, it has been found preferable to provide an inverted leaf-type spring 416 which is connected between the suspension assemblies 310 of the front vehicle wheels 18 and 20 and the front axle 16. The leaf spring 416 as shown herein comprises a plurality of leaf spring members 418 disposed in a superimposed, cantilevered arrangement with the outer ends of the assembly 416 bolted or otherwise suitably secured to the plates 318 of the suspensions 310, as shown at 420 and 422. The central portion of the assembly 416 is bolted to the axle 16 as shown at 424. The leaf spring 416 provides a stability for the wheels 18 and 20 in the elevated position thereof during travel of the vehicle 10 along the railway 32.

Referring now to FIG. 14, the steel wheels 36 and 38 may be secured to the connector blocks 140 and 156, respectively, in a manner (not shown) permitting at least a slight pivotal motion of the wheels 36 and 38 about a vertical axis. In addition, a suitable hydraulic cylinder 426 may be connected with the wheel 36 in any well known manner whereby the piston rod 428 thereof will be reciprocated upon any pivotal movement of the wheel 36 about said vertical axis. A similar hydraulic cylinder 430 is connected with the wheel 38 whereby the piston rod 432 thereof will be reciprocated simultaneously with the pivotal movement of the wheel 38 about said vertical axis. The one end of the cylinder 426 is hydraulically connected with one end of the cylinder 430 by a suitable conduit or hydraulic line 434. Similarly, the other end of the cylinder 430 is hydraulically connected with the other end of the cylinder 426 by a conduit or hydraulic line 436. As the wheels 36 and 38 are moving along a curve in the rails 28 and 30, the outboard wheel 36 or 38 will receive pressure of the rail against the flange 40 thereof. When the pressure against the flange 40 becomes sufficiently great, the wheel will pivot about said vertical axis to more nearly align the plane of the flange 40 with the line of the respective rail. It has been found that a pivoting of approximately three and one-half degrees in either direction about the vertical axis is sufficient for substantially any curve which may be found in a railway track. Assuming that the wheel 36 is the outboard wheel, it will be apparent that any pivotal movement of the wheel causes the piston rod 428 of the cylinder 426 to move in a corresponding direction, thus forcing fluid from the cylinder 426 to the cylinder 430 for causing a simultaneous and synchronized movement of the piston rod 432 thereof. The movement of the rod 432 causes the wheel 38 to move through a pivotal angle corresponding to the movement of the wheel 36, thus preventing "crabbing" of the wheels 36 and 38 as the vehicle 10 moves around a curve on the track. It will be apparent that a suitable accumulator (not shown) may be provided for the hydraulic lines 434 and 436, if desired.

Of course, when it is desired to convert the vehicle 10 to a highway vehicle, the procedure is reversed whereby the cylinders 94 and 108 of the front wheel guide assembly are activated for retracting the pistons 184 thereof until the front wheels 18 and 20 of the vehicle 19 are again resting on the rails. When the pistons 184 have been fully retracted, the pistons 74 and 86 may be activated for retracting the piston rods thereof to pivot or rotate the cylinders 94 and 108 to the retracted position thereof shown in FIG. 7. The rear guide wheel assembly 34 may be similarly activated for retracting the pistons 184 of the cylinders 94 and 108 and for retracting the piston rods of the cylinders 74 and 86 to return the cylinders 94 and 108 to the retracted position thereof. The pawl 338 may then be placed in the locking position for retaining the cylinders 94 and 108 in the retracted position and the vehicle 10 may be driven off of the railway at a railway crossing, or the like, for normal highway use.

From the foregoing it will be apparent that the present invention provides a novel steel guide wheel for convertible pneumatic tired rail-highway vehicles wherein the usual pneumatic tired vehicle available today may be readily converted to a rail-highway type vehicle. The novel guide wheel assembly comprises a pair of steel guide wheels carried by independent hydraulic cylinders which are maintained in a retracted position similar to the retracted position of the wheels of an aircraft during use of the vehicle as a highway vehicle. When the vehicle is to be converted to a rail vehicle, the cylinders are simultaneously lowered to a position wherein the guide wheels are placed above and substantially in alignment with the rails of the railway track and the cylinders are then activated for extending the piston rods thereof to move the guide wheels into guiding engagement with the rails. The front wheels of the vehicle are elevated from the rails to preclude engagement therebetween during use of the vehicle on a railway. The load on the rear wheels of the vehicle is controlled to maintain the rear wheels of the vehicle in engagement with the rails at the optimum load thereon to provide optimum traction and braking for the vehicle during travel along the rails. Each guide wheel is independently activated by its own independent cylinder, with each of the wheel actuating cylinders being provided with its own accumulator whereby any accidental breakage of a hydraulic line will not result in immediate loss of fluid pressure in the cylinder. When a break in a line to one of the cylinders occurs, the valve assembly in the respective cylinder curtails the loss of fluid therefrom, and the accumulator in each cylinder replaces the lost fluid in such a manner that only a "slow leak" situation occurs, which may be detected by the operator of the vehicle, thus avoiding any accidental derailing of the steel guide wheels during operation of the vehicle along the rails. In addition, the guide wheels are particularly designed and constructed for responding to pressure of a curving rail against the wheel flanges to automatically pivot or turn the steel wheels in compliance with the curve of the rails to preclude "crabbing" of the wheels as the vehicle traverses the curve. The overall vehicle has been particularly designed to meet all Federal requirements for safety in railway and highway operation. The novel guide wheel assembly is economical and durable in construction and simple and efficient in operation.

Whereas the present invention has been described in particular relation to the drawings attached hereto, it should be understood that other and further modifications, apart from those shown or suggested herein, may be made within the spirit and scope of this invention.

What is claimed is:

1. In a combined road and rail vehicle of a type having front and rear load bearing tires for use of a vehicle on a highway, and front and rear steel guide wheels for use of a vehicle on a railway, each of said guide wheels having a riding surface rollable along said railway and a radially extending flange; a steel guide wheel assembly for one of said steel guide wheels, comprising: a supporting means rigidly secured to the vehicle frame, an elongated hydraulic cylinder carried by said supporting means, said cylinder having a piston reciprocably mounted therein and a piston rod connected at one end to said piston, said piston rod having an other end extending outwardly from said cylinder, said guide wheel being rotatably supported at said other end of said piston, linkage means for rotating said cylinder from a substantially horizontal position where said guide wheel is positioned relatively laterally outward and upward to a substantially vertical position where said guide wheel is relatively inward and downward and spaced above the rail, and means for actuating said cylinder when said guide wheel is in its relatively inward and downward position for urging said piston downwardly to bring said guide wheel into contact with a rail of said railway and for removing at least a portion of the load from the load bearing tire next adjacent said guide wheel.

2. The improvement according to claim 1 wherein said guide wheel assembly is provided for each of said guide wheels.

3. The improvement according to claim 2 wherein there are a pair of front steel guide wheels and a pair of rear steel guide wheels with means for operating front guide wheels independently of rear guide wheels.

4. The improvement according to claim 1 wherein the piston divides the cylinder into two chambers on opposite sides of the piston, the piston rod is hollow and communicates through the piston with the cylinder chamber situated side opposite from the piston rod, a floating internal piston in the piston rod chamber dividing the piston rod chamber into a first compartment adjacent the piston and a second compartment on the opposite side of the floating piston from the first compartment, means for directing gaseous fluid into said second compartment for application of pressure to the second compartment side of said floating piston, means for directing a hydraulic fluid to said first compartment for applying pressure to the opposite side of said floating piston for equalizing the pressures acting thereon, said hydraulic fluid in said other chamber providing a fluid supply source for the hydraulic cylinder upon any accidental loss of hydraulic fluid from the cylinder.

5. The improvement according to claim 4 including a valve means disposed in said cylinder for permitting the passage of hydraulic fluid into and out of the cylinder chamber situated side opposite from the piston rod, said valve means comprising a valve sleeve removably secured in the cylinder, a valve seat provided in the sleeve, a valve insert reciprocally disposed in the sleeve, first yieldable means cooperating with the insert for maintaining the insert in a normally closed position against the valve seat, a check valve provided in said valve insert, second yieldable means cooperating with the check valve for maintaining the check valve in a normally closed position, said valve insert being responsive to fluid pressure acting against the first yieldable means for moving thereagainst for selective opening of the valve for admitting the passage of fluid through the valve in one direction, and said check valve being responsive to fluid pressure acting against the second yieldable means for selectively opening the valve for admitting the passage of fluid through the valve in an opposite direction.

6. The improvement according to claim 1 wherein the supporting means comprises a support plate, a guide pin carried by the elongated hydraulic cylinder, and a guide slot provided on the support plate for receiving the guide pin therein for the guide pin to be reciprocally movable in said guide slot upon actuation of the means for rotating the elongated hydraulic cylinder.

7. The improvement according to claim 6 wherein the means for rotating the elongated hydraulic cylinder comprises a second hydraulic cylinder pivotally secured to the support plate and linkage operably connected between the second hydraulic cylinder and the elongated hydraulic cylinder; said linkage having a pair of spaced disc members journalled on the support plate, a turnbuckle pivotally connected between each of the discs and the elongated hydraulic cylinder, and a crank arm connected between the discs and the second hydraulic cylinder whereby actuation of the second hydraulic cylinder transmits oscillatory motion to the disc members, said turnbuckle being responsive to the oscillatory motion of the disc members for moving the guide pin in the guide pin slot to provide rotational movement for the elongated hydraulic cylinder.

8. The improvement according to claim 1 wherein separate guide wheel assemblies are secured to both the front and rear of the vehicle in association with the vehicle front and rear wheels, said front guide wheels being operable independently of the rear guide wheels for engaging the front guide wheels with the rails whereby the front vehicle wheels are elevated from engagement with the rails in order that the entire load of the front portion of the vehicle is carried by the front assembly guide wheels, said rear guide wheels being operable independently of the front guide wheels whereby the rear guide wheels are engaged with the rails in order that a portion of the load of the rear of the vehicle is carried by the rear guide wheels and a portion of the load is carried by the vehicle rear wheels.

9. The improvement according to claim 8 wherein the guide wheels pivot about a vertical axis through a limited degree of rotation in response to pressure on the guide wheels from a curving rail, means interconnecting the guide wheels for simultaneous rotational movement therebetween about said vertical axis.

10. The improvement according to claim 8 wherein the vehicle is provided with coil spring front suspension having a separate plate, rotatable rods, tabs affixed to the rotatable rods, and means for rotating the rotatable rods which when appropriately positioned arrest the downward movement of the front vehicle wheels when the front of the vehicle is lifted off the ground.

11. A steel guide wheel assembly for convertible pneumatic tired rail-highway vehicles and comprising a separate guide wheel assembly secured to the front and rear of the vehicle, each guide wheel assembly comprising a pair of steel guide wheels, means connecting the guide wheels with the vehicle, retracting and lowering means provided on the connecting means for upwardly and outwardly retracting the guide wheels with respect to the vehicle and for alternate inwardly and downwardly lowering of the guide wheels with respect to the vehicle to position the guide wheels directly over the railway, and means for further lowering the guide wheels into contact with the rails and for carrying at least a portion of the vehicle weight.

* * * * *